W. R. KORNHOFF.
MILLING MACHINE.
APPLICATION FILED MAR. 3, 1915.
1,176,837.
Patented Mar. 28, 1916.
3 SHEETS—SHEET 1.
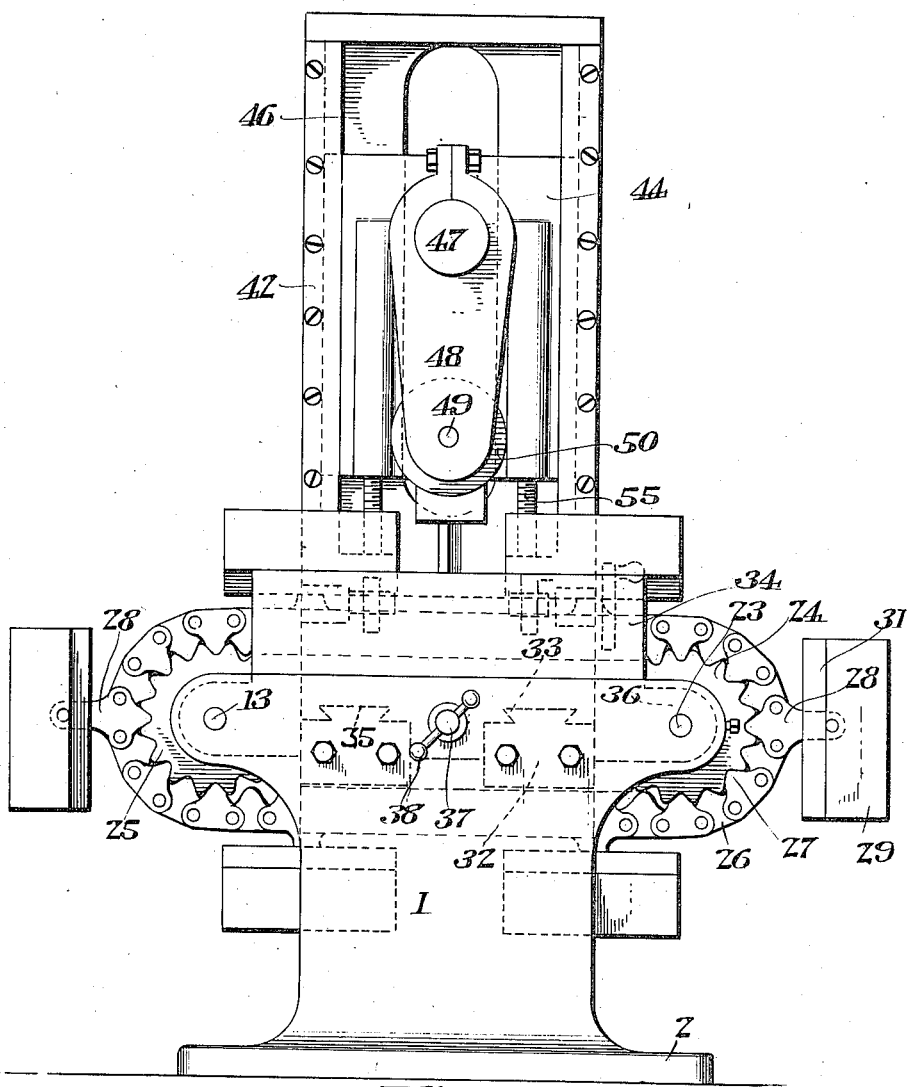
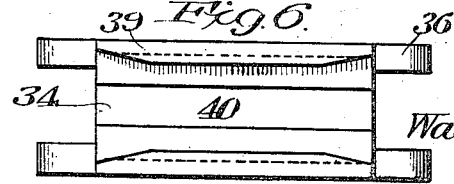

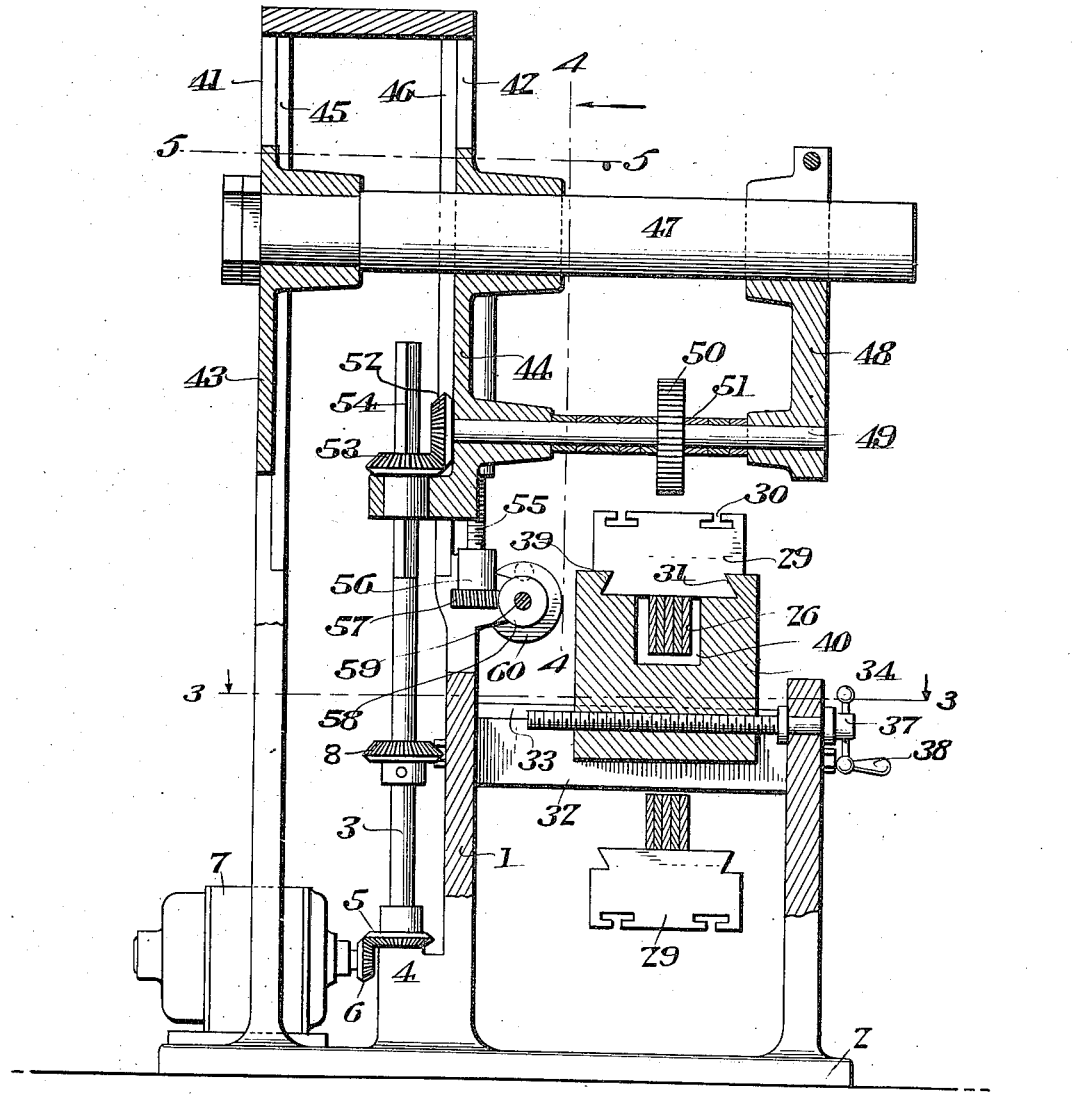

W. R. KORNHOFF.
MILLING MACHINE.
APPLICATION FILED MAR. 3, 1915.
1,176,837.
Patented Mar. 28, 1916.
3 SHEETS—SHEET 3.
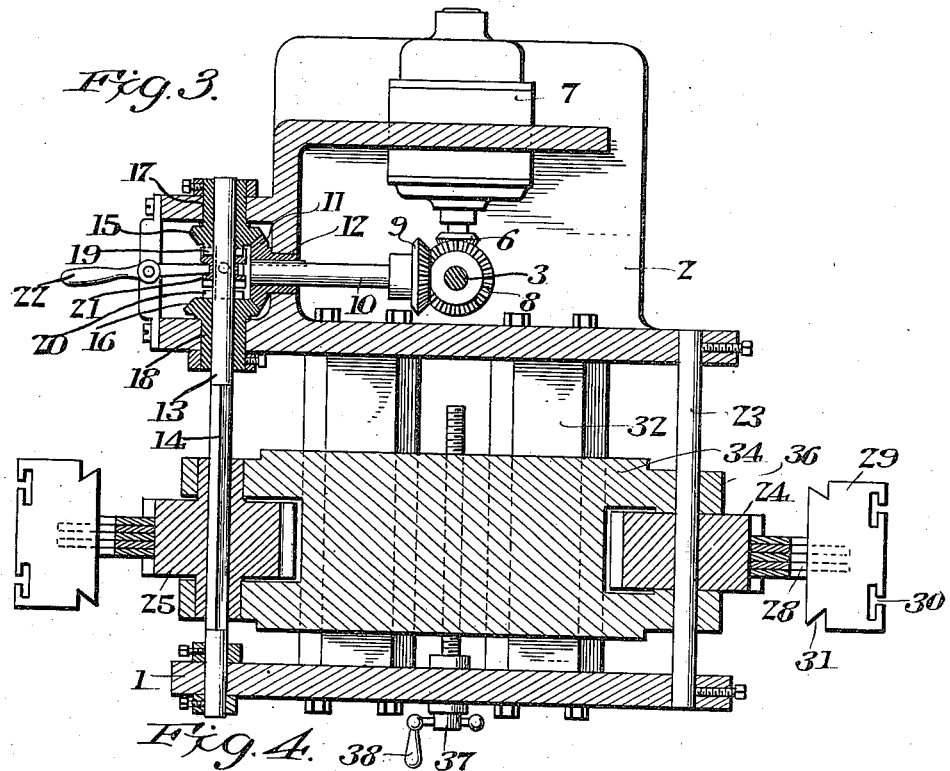
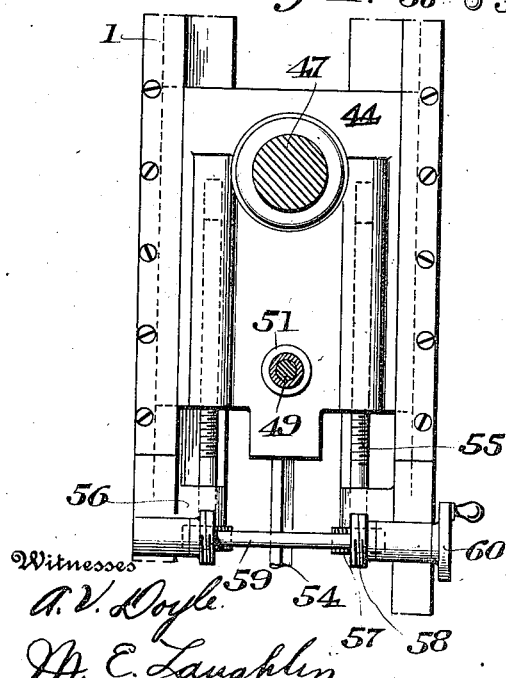
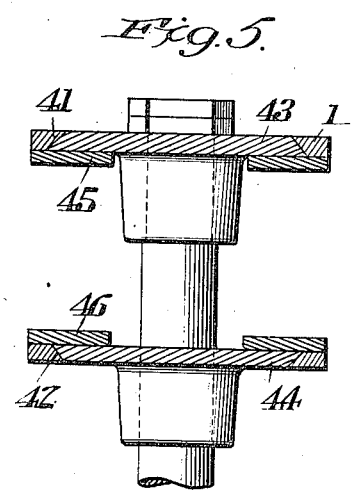
Inventor
Walter R. Kornhoff,
By Victor J. Evans
Attorney
Witnesses
A. V. Doyle
H. E. Laughlin

UNITED STATES PATENT OFFICE.

WALTER R. KORNHOFF, OF CLIFTON, NEW JERSEY.

MILLING-MACHINE.

1,176,837.

Specification of Letters Patent.

Patented Mar. 28, 1916.

Application filed March 3, 1915. Serial No. 11,842.

*To all whom it may concern:*

Be it known that I, WALTER R. KORNHOFF, a citizen of the United States of America, residing at Clifton, in the county of Passaic and State of New Jersey, have invented new and useful Improvements in Milling-Machines, of which the following is a specification.

This invention relates to continuous milling machines and it consists in the novel features hereinafter described and claimed.

An object of the invention is to provide a milling machine of simple and durable structure having a series of work holders mounted upon a chain which moves in an orbit about a table adjustably mounted upon the frame of the machine. The said work holders and the table are provided with substantial guiding means whereby the work holders may move longitudinally along the table but are restrained against movement in all other directions while they are upon the top of the table. A milling tool is journaled for rotation at the upper portion of the frame of the machine and may be adjusted vertically and transversely of the table. Means is provided for moving the work holders in either of two directions over the table and as the said work holders are adapted to support pieces of work of the same design or configuration the same milling operation is imparted to all of the pieces of work supported upon all of the work holders and after the parts of the machine have been properly set or adjusted the milling operation upon all of the pieces of work is accomplished in a uniform and automatic manner.

In the accompanying drawings:—Figure 1 is a front elevation of the milling machine. Fig. 2 is a vertical transverse sectional view of the same. Fig. 3 is a horizontal sectional view of the same taken on the line 3—3 of Fig. 2. Fig. 4 is a vertical sectional view of parts of the same taken on the line 4—4 of Fig. 2. Fig. 5 is a horizontal sectional view of parts of the same taken on the line 5—5 of Fig. 2. Fig. 6 is a top plan view of the table of the milling machine.

The milling machine comprises a frame 1 which is mounted upon a suitable base 2. A shaft 3 is journaled in a pillow bearing 4 provided upon the frame 1 and carries at its lower end a beveled gear wheel 5 which meshes with a similar wheel 6 mounted upon the shaft of a motor 7. The motor 7 is mounted upon the base 2 as best shown in Fig. 2 of the drawing. A beveled gear wheel 8 is fixed to the intermediate portion of the shaft 3 and meshes with a beveled gear wheel 9 fixed to a shaft 10 and to which is also fixed a beveled gear wheel 11. The wheel 11 is provided with a hub 12 which is journaled in the frame 1 as best shown in Fig. 3 of the drawing. A shaft 13 is disposed transversely across one end of the frame 1 and is journaled for rotation therein. The shaft 13 is provided with a squared or non-circular intermediate portion 14. Beveled gear wheels 15 and 16 are provided with hubs 17 and 18 respectively which are journaled in the frame 1. The beveled gear wheels 15 and 16 mesh with the beveled gear wheel 11 at the opposite sides thereof. The shaft 13 is loosely journaled in the hubs of the beveled gear wheels 15 and 16. The beveled gear wheels 15 and 16 are provided at their inner sides with clutch members 19 and 20 respectively and a clutch member 21 is slidably mounted upon the shaft 13 but is constrained to rotate in unison therewith. A lever 22 is fulcrumed upon the frame 1 and engages the clutch member 21 and may be used for the purpose of moving the said clutch member into engagement with either the clutch member 19 or the clutch member 20. The motor 7 when in operation through the intermeshing gear wheels 6 and 5 rotates the shaft 3 which through the intermeshing gear wheels 8 and 9 rotates the shaft 10. When the clutch member 21 is in engagement with the clutch member 19 rotary movement is transmitted from the shaft 10 through the gear wheel 11 and gear wheel 15 and the clutch member 21 to the shaft 13 in one direction. When the clutch member 21 is in engagement with the clutch member 20 rotary movement is transmitted from the shaft 10 through the gear wheel 11 and gear wheel 16 and clutch member 21 to the shaft 13 in an opposite direction. Therefore means is provided whereby the shaft 13 may be rotated in either of two directions.

When the clutch member 21 is between the clutch members 19 and 20 and out of engagement with both of the said clutch members 19 and 20 the wheel 11 transmits rotary movement to the wheels 15 and 16 in opposite directions but the shaft 13 remains at a state of rest. A shaft 23 is fixed in the frame 1 at the side thereof opposite that side at which the shaft 13 is journaled and the shaft 23 is provided with a cylindrical periphery. A sprocket wheel 24 is loosely journaled on the shaft 23 and may move longitudinally along the same. A sprocket wheel 25 is slidably mounted upon the non-circular portion 14 of the shaft 13 and may move longitudinally along the said portion 14 of the shaft. A sprocket chain 26 is trained around the sprocket wheels 24 and 25 and the links of the chain 26 are provided at their inner edges with lugs 27 adapted to enter the spaces between the teeth of the wheel 24 and 25 as best indicated in Fig. 1 of the drawings. Some of the links of the chain 26 are provided with outstanding lugs 28 upon which are pivotally mounted work holders 29. The work holders 29 are provided at their outer sides with longitudinally disposed grooves 30 by means of which the work may be secured in position upon the said work holders 29 in any suitable or usual manner. The work holders 29 are provided at their sides and in the vicinity of their inner faces with longitudinally disposed grooves 31 which have converging inner walls as best shown in Figs. 2 and 3 of the drawing.

The frame 1 includes transversely disposed bars 32 which are provided at their upper sides with under cut shoulders 33. A table 34 is slidably mounted upon the bars 33 and is provided at its under side with grooves 35 having converging side walls which receive snugly between them the shoulders 33 of the bars 32. The table 34 is provided at its opposite ends with ears 36 which lie at the opposite sides of the sprocket wheels 24 and 25 as best shown in Fig. 3. The said ears 36 also have openings which receive the shafts 23 and 13. A screw 37 is journaled in the outer portion of the frame 1 and is restrained against longitudinal movement therein. The said screw is provided at its outer end with a crank handle 38. The intermediate portion of the screw 37 is threaded through the table 34 and by turning the screw 37 the said table 34 may be moved across the frame 1 from the front side to the intermediate portion thereof. As the said table 34 moves transversely across the frame 1 as indicated the ears 36 carry the gear wheels 24 and 25 with them and the chain 26 which is trained around the said gear wheels and the parts mounted thereon are moved with the said table. The table 34 is provided at its upper side and along its longer edges with under cut guides 39 adapted to receive the work holders 29 between them and adapted to enter the grooves 31 of the said work holders and hold the said work holders 29 against movement in any direction with relation to the said table except longitudinally thereof as the work holders pass over the table. The table 34 is provided at its upper side with a longitudinally disposed groove 40 through which the upper run of the chain 26 may pass. The frame 1 also includes vertically disposed guides 41 and 42 (see Fig. 5) which have converging inner faces and brackets 43 and 44 fit snugly at their edges against the inner edges of the guides 41 and 42 respectively and are adapted to move vertically between the said guides. The brackets 43 and 44 are held in position by means of plates 45 and 46 which are secured in any suitable manner to the frame 1 and which over-lap the edge portions of the brackets 43 and 44. The said plates 45 and 46 restrain the brackets 43 and 44 against the lateral movement in the guides 41 and 42. An arm 47 is fixed in the upper portions of the brackets 43 and 44 and passes transversely through the same as best shown in Fig. 2 of the drawing. A bracket 48 is adjustably secured to the forward portion of the arm 47 and a shaft 49 is journaled for rotation in the lower portions of the brackets 44 and 48 and is disposed across the space between the said brackets as best shown in Fig. 2 of the drawing. A milling tool 50 is fixed to the intermediate portion of the shaft 49 and is held in proper spaced relation from the brackets 44 and 48 by means of washers 51 strung upon the shaft 49 and which bear against each other at their sides, the innermost washers bearing against the opposite sides of the milling tool 50 and the outermost washers 51 bearing against the brackets 44 and 48 as shown in Fig. 2.

A beveled gear wheel 52 is fixed to the rear end of the shaft 49 and meshes with a beveled gear wheel 53 journaled upon the bracket 44. The upper end of the shaft 3 is squared or non-circular as at 54 and the said squared or non-circular portion passes through the center of the wheel 53 and may slide therein. However the wheel 53 is constrained to rotate in unison with the shaft 3. Screws 55 are journaled for rotation in bearings 56 provided upon the frame 1 and the upper portions of the screws 55 have threaded engagement with the brackets 44. The screws 55 are provided at their lower end with fixed worm wheels 57 which mesh with worms 58 mounted upon a shaft 59 journaled for rotation in the frame 1. The shaft 59 is provided at one end with a fixed hand wheel 60 which may be used for the purpose of rotating the said shaft. Therefore it will be seen that when the shaft 59 is rotated movement is transmitted to the worm 58 and worm wheels 57 to the screws 55 whereby the bracket 44 and the arm 47 may be raised or lowered. During this raising or lowering movement on the part of the bracket 44 the beveled gear wheel 53 is moved along the squared or non-circular portion 54 of the shaft 53 and the milling tool 50 may be raised or lowered with relation to the table 34. By removing the washers 51 from the shaft 49 and shifting the milling tool 50 along the shaft 49 and replacing the washers the milling tool 50 may be positioned in any desired plane above the table 34.

In operation the pieces of work are secured in position upon the work holders 29 and the said work holders are started in movement along the upper side of the table 34. As the pieces of work pass under the milling tool 50 the said tool operates upon the pieces and each piece as it passes under the tool receives the same milling operation.

From the above description taken in conjunction with the accompanying drawing it will be seen that a milling machine of simple and durable structure is provided and that the parts thereof are susceptible to a vast number of adjustments in order to accommodate the tool to pieces of work of various sizes and shapes and in order to cause the tool to operate in a uniform manner upon each piece as it is successively presented to the tool.

Having described the invention what is claimed is:—

A milling machine comprising a frame, a table mounted thereon and provided with a groove having converging side walls, means for shifting the table transversely of the frame, a chain mounted for movement along the table, work holders carried by the chain and having parts which fit snugly between the converging walls of the groove of the table whereby the chain, the work holders and operating parts are movable transversely of the frame with the table, and a milling tool mounted for operation adjacent the path of movement of the work holders.

In testimony whereof I, affix my signature in presence of two witnesses.

WALTER R. KORNHOFF.

Witnesses:
 KARL J. KISTLER,
 M. K. PAYNE.